United States Patent [19]

Purvis

[11] Patent Number: 4,549,295
[45] Date of Patent: Oct. 22, 1985

[54] SYSTEM FOR IDENTIFYING DEFECTIVE MEDIA IN MAGNETIC TAPE STORAGE SYSTEMS

[75] Inventor: Dwayne E. Purvis, Vienna, Va.

[73] Assignee: International Business Machines Corporation, Armonk, N.Y.

[21] Appl. No.: 506,552

[22] Filed: Jun. 21, 1983

[51] Int. Cl.⁴ .................. G06F 11/10; G11C 29/00
[52] U.S. Cl. ........................... 371/13; 360/53; 371/38
[58] Field of Search .................. 371/13, 38, 21; 360/38.1, 53

[56] References Cited

U.S. PATENT DOCUMENTS

| | | | |
|---|---|---|---|
| 2,972,127 | 2/1961 | Lukoff et al. | 371/13 |
| 3,273,120 | 9/1966 | Dustin et al. | 371/13 |
| 3,582,880 | 6/1971 | Beausoleil | 371/13 |
| 3,619,585 | 11/1971 | Edmondson | 371/13 |
| 4,360,915 | 11/1982 | Sindelar | 371/13 |
| 4,361,855 | 11/1982 | Igarashi | 360/53 X |
| 4,404,673 | 9/1983 | Yamanouchi | 371/13 |

Primary Examiner—Charles E. Atkinson
Attorney, Agent, or Firm—James M. Thomson

[57] ABSTRACT

A method and associated system for monitoring errors that occur in magnetic media storage read and write operations, for identifying uncorrectable errors and classifying them. In the system, a counter keeps track of specific locations of data blocks as well as the physical locations of the data recorded upon the media. When an error occurs in read or write operations that cannot be corrected by the error correction circuits, the error location is stored. After an error correction procedure, including usual retry operations, is completed, the count values of the error correction procedures are also stored. Means are provided for comparing the recorded error counts for initial and retry operations. A match of error positions, not correctable through standard error recovery procedures and in the presence of valid recording channel electronics operation, indicates a media defect at the identified location.

6 Claims, 4 Drawing Figures

SYSTEM FOR IDENTIFYING DEFECTIVE MEDIA IN MAGNETIC TAPE STORAGE SYSTEMS

FIELD OF THE INVENTION

The invention relates to magnetic media storage systems, and particularly to means within such systems for distinguishing or classifying errors caused by defective media, errors caused by faulty read/write electronics, and errors caused by dirty recording heads.

The embodiment described herein could be utilized with state of the art magnetic recording systems such as that described in U.S. Pat. application No. 241,323, filed Mar. 6, 1981, by Bauer, et al, titled Peripheral System Having a Data Buffer for a Plurality of Peripheral Devices, etc.

DESCRIPTION OF THE PRIOR ART

It is well recognized that media such as magnetic tape utilized in magnetic storage application is subject to defects. Defects can exist in new tape due to manufacturing faults, and other defects can occur in tape as it is used in storage operations where scratches, or the presence of dust and debris often contribute to the occurrence of errors upon reading or recording operations upon the tape.

A particle of debris on the media may cause an error having the same appearance to the system as a faulty media caused error. Furthermore, debris errors may be manifested as random errors, in that the debris can move upon the media during read or write operations. However, such errors usually can be corrected by error correction circuitry of state of the art design.

A more serious type of error results from structural media defects, which can span several blocks of data or multiple tracks. Errors due to large sections of defective media usually are not recoverable through standard error recovery procedures. Therefore, it is usual to classify such errors as uncorrectable errors after the error correction circuits have processed the faulty data a given number of times without success.

Consequently, it is desirable to avoid utilization of defective areas of magnetic tape, and to determine the locations of such defective areas so that they can be avoided. It is also desirable to distinguish or classify hardware caused errors as opposed to debris caused errors occurring in read/write operations.

U.S. Pat. No. 4,255,807 describes means for testing recording media such as magnetic tape. The system described is intended for use in the testing of newly manufactured tape. The technique used involves sensing an error in a first track of tape and defining an error evaluation segment for that track of preselected length. The errors occurring in the first track are then compared to error positions in other tracks of the tape whereby errors can be classified as one-track errors, two-track errors or three-track errors. The technique described is distinct from applicant's invention in that it provides no means for distinguishing between hardware caused errors and media errors occurring during read/write operations.

U.S. Pat. No. 3,273,120 also describes an error correction system relating to magnetic tape systems. The patent utilizes an error correction system involving retransmission of error data to correct the errors. It is recognized that uncorrectable errors may be caused by large area tape defects, and it designates errors not corrected on a second pass as permanent errors. However, the patent fails to disclose any technique for storing tape error locations and for comparing such locations on initial and retry passes of the error correction circuitry. Consequently, the system does not appear to include any effective means for differentiating between hardware faults and media caused faults.

SUMMARY OF THE INVENTION

Accordingly, it is an object of the invention to provide a method and apparatus for monitoring errors that occur in magnetic media storage systems and particularly in tape storage systems, for identifying and distinguishing between errors that occur during read/write operations due to defective magnetic media regions, faulty recording channel electronics, and/or a dirty recording head-media interface.

In the system disclosed, a microprocessor controlled counter monitors specific locations of data blocks being handled during read/write operations, as well as the physical locations of the data blocks as they are recorded upon the media. When an error occurs, the error correction circuits of the system operate in the usual fashion to correct the error. If such error correction is susccessful, the system operation continues. However, if an error is not correctable, then the count value of the counter corresponding to that error position is stored. The counter is then reset and the read/write operation is repeated or retried.

If an error again occurs, the error correction circuits again operate to attempt to correct it. As before, if the correction is successful, the system continues in operation. However, if another uncorrectable error is detected, then its corresponding count value is again stored. Upon completion of the retry operation, the count value occurring on the retry operation is compared with the count value of the original run.

If the count values match, indicating the occurrence of an uncorrectable error at the same location on both read/write operations, then further diagnostics are indicated to distinguish between the various kinds of possible errors. Accordingly, an error recovery procedure is again invoked to try and correct the error. If the error recovery procedure is successful, then a temporary error record is placed in the statistical error record and the system returns to normal operation. However, if the error recovery procedure is unsuccessful, a loop write to read operation is invoked to verify proper operation of the recording channel electronics.

If the recording channel electronics is functioning properly, it can then be concluded that the error was caused by faulty media. Accordingly, if a write operation is involved, the faulty media is skipped and the write operation is repeated. If a read operation is involved, that section of media can be designated by the system as faulty so that it will not be used again. In that event, however, the data to be read is either considered unreliable, or is trnasmitted for reprocessing by other means.

If, on the other hand, a mismatch of count values is found to occur, then an error recovery procedure is invoked again. If the error recovery procedure is successful, then a temporary error is recorded in the statistical error record and the system returns to normal operation. If the error recovery procedure is again unsuccessful, then a loop write to read operation is invoked to verify proper operation of the recording channel electronics. If the loop write to read operation is unsuccessful, the a hardware failure indication is provided so that the operator may call a customer engineer. If the loop write to read operation is successful, then it can be concluded that the error occurred due to a dirty head tape interface. In that event, an indication is provided to cause the operator to clean the head.

BRIEF DESCRIPTION OF THE DRAWINGS

The foregoing and other features and advantages of the invention will be understood from the following detailed description taken in conjunction with the accompanying drawings in which.

DETAILED DESCRIPTION OF THE INVENTION

Figure 1:
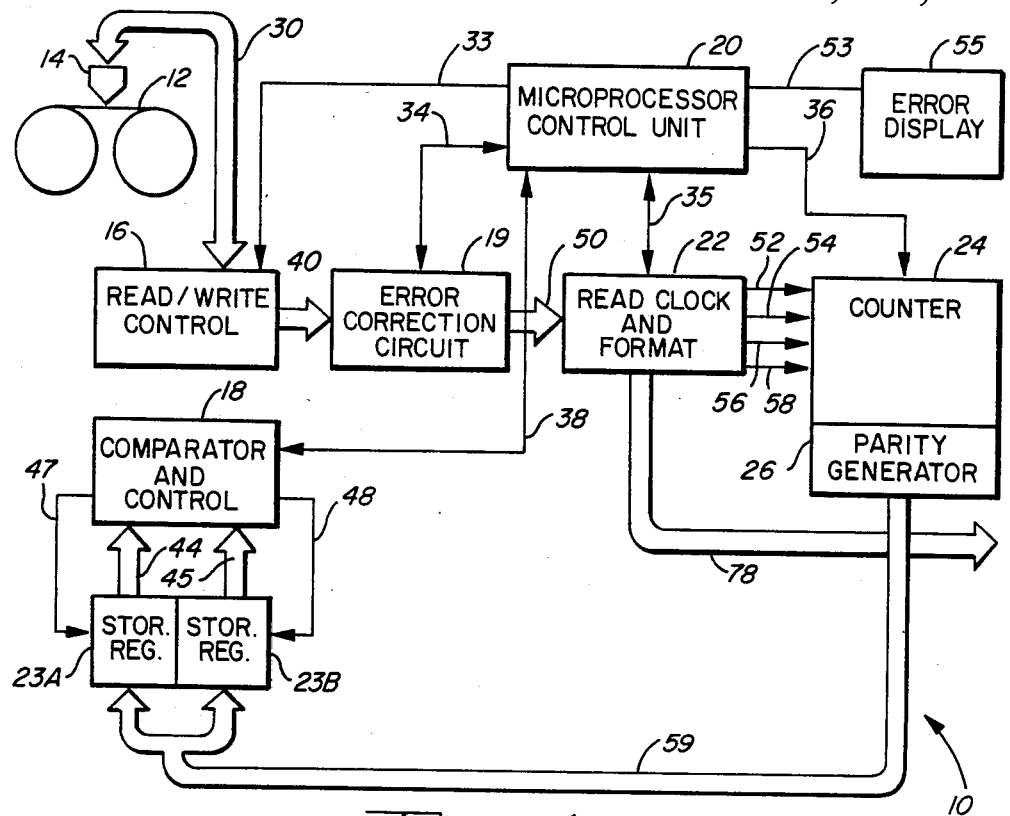
FIG. 1 is a generalized block diagram illustrating one preferred embodiment of the invention.

Referring now to the drawings, and particularly to FIG. 1, a magnetic tape storage system is schematically illustrated at 10 including a reel-to-reel tape apparatus 12 of conventional design. A read/write head 14 is associated with the tape apparatus for performing conventional read/write operations thereon. The system includes a read/write control 16 and conventional error correction circuits 19, and a microprocessor control unit 20. The system also includes a read clock and format block 22, a comparator 18 and storage register means 23A, 23B associated with the comparator. FIG. 1 otherwise illustrates a counter 24 having a parity generator 26 associated therewith and a data bus 28, which interconnects the read clock and format block with other portions of the system.

In the system illustrated the recording head 14 is interconnected with read/write control 16 by cable 30. The microprocessor control unit is connected by cable 33 to the read/write control, by cable 34 to the error correction circuits, by cable 35 to the read clock and format block, and by cable 36 to the counter. The microprocessor is also interconnected with the comparator and control block by cable 38.

The read/write control is connected to the error correction circuits by cable 40 and to the comparator control by cable 42. As shown, the comparator is adapted to receive data from the storage registers via buses 44, 45 respectively. Likewise, the storage registers are connected to the comparator control by conductors 47, 48. The error correction circuits are connected to the read clock and format circuit by cable 50.

The counter may receive data signals from the rate clock circuits via bus 52, a start frame signal via bus 54, a reset signal via bus 56 and a stop frame signal via bus 58. The parity generator is connected to the storage registers via the cable 59. An error display unit 55 is associated with the microprocessor via cable 53 to display the error causes in a manner described hereinafter.

Figure 2:
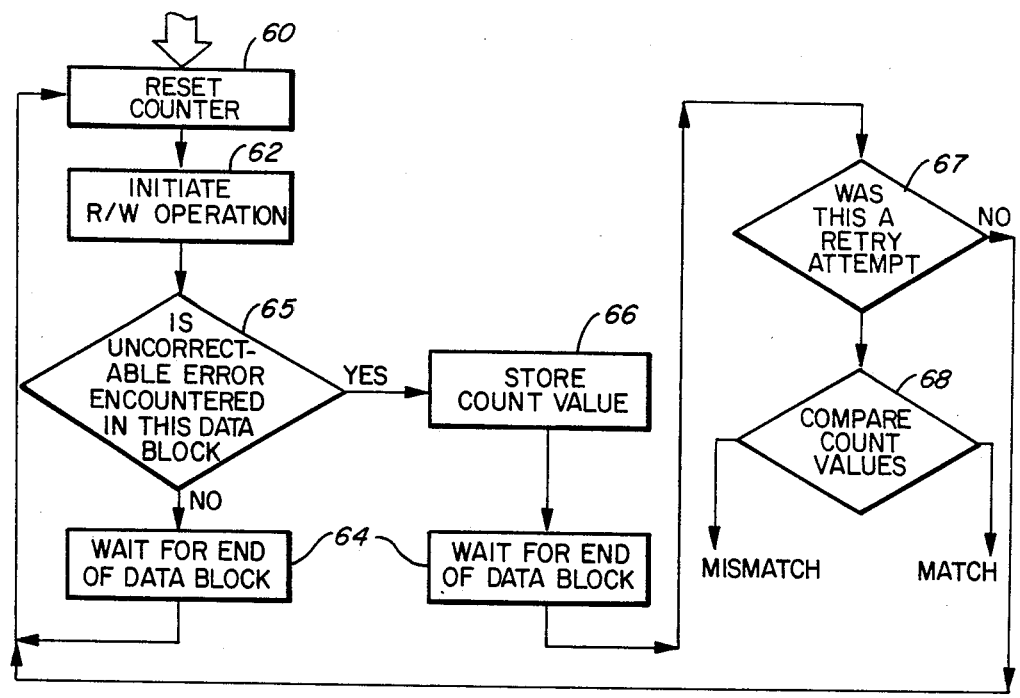
FIG. 2 is a flowchart illustrating the operation of the system and microcode within the preferred embodiment.
Figure 3:
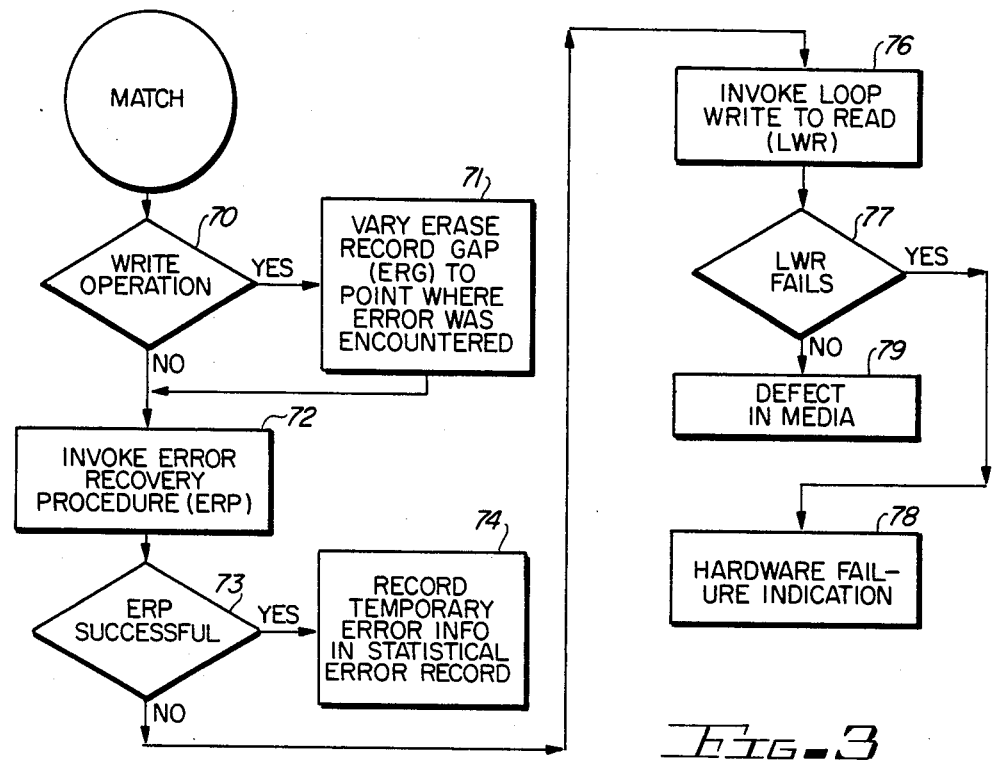
FIG. 3 is a flowchart of additional system and microcode process carried out with the invention.
Figure 4:
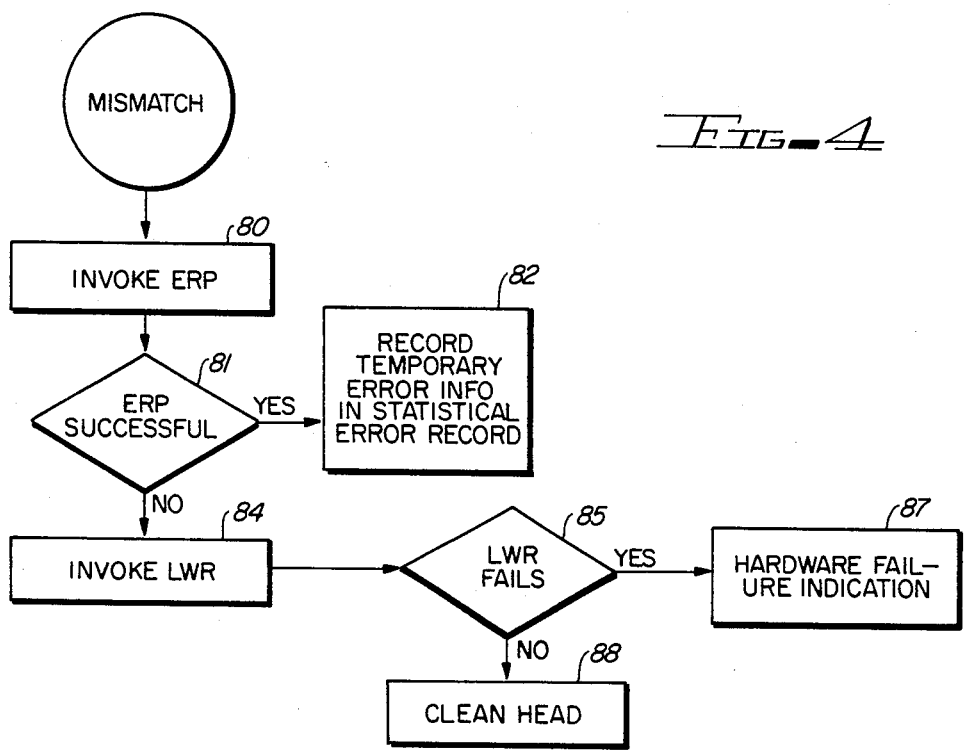
FIG. 4 is a flowchart of yet additional system and microcode operations carried out within the preferred embodiment.

The functions of the circuits and signals will become apparent from the following description of the flow charts illustrated in FIGS. 2-4. More particularly, FIGS. 2-4 show flowcharts illustrating the operation of the system to categorize errors as described hereinbefore. A reset counter block 60 is illustrated in FIG. 2 which is responsive to the reset signal from the read clock and format block. Resetting of the counter is followed by initiation of a read/write operation and a start counter signal, again received from the read clock and format block. These operations are represented by block 62 in FIG. 2.

The read/write operation continues with the counter running and in the event an uncorrectable error occurs as illustrated in Block 65, the value of the counter, at the instant the error is detected, is stored in one of the storage regiters 23A and 23B as illustrated in FIG. 1. A microcode block 64 is indicated which identifies the end of a data block based upon a signal from the read clock and format circuits. Upon detection of the end of a data block.

A determination is made as indicated in block 67 whether the count stored occurred on a first read/write operation or upon a retry operation. If a retry operation was involved, then a comparison of the count value is made at that time with a previously stored count value that occurred on the first attempt to determine whether a match or a mismatch occurred.

In the event that retry operation was not involved, i.e. this was a first read/write operation, then the counter is reset as illustrated in FIG. 2 and a retry operation is initiated by repeating the read/write operation. Following completion of the retry operation, a determination will again be made whether an uncorrectable error occurred in the data block and was stored in the counter. If an uncorrectable error occurred both in the original operation and in the retry operation, then a compare count operation is carried out by the comparator as illustrated in block 68. This provides a match signal in the event that the uncorrectable errors occurred at the same tape location on both the original and retry attempts of the read/write operation, and it may provide a mismatch signal in the event that uncorrectable errors occurred at different locations during the original and retry operations of the read/write operation.

FIG. 3 illustrates a flow diagram of the processing which occurs in the event of a matched signal. As shown, in the event of a matched signal, a determination is made by the microprocessor as illustrated in block 70 whether or not a write operation was involved. If a write operation was involved, an operation is carried out to vary the erase record gap (ERG) to the point where the error was encountered. An error recovery procedure is then invoked as indicated in block 72.

In the event of a read operation, the ERG does not have to be altered prior to invocation of the error recovery procedure. As indicated in block 73, after the error recovery procedure a determination is made whether it was successful. In the event that the error recovery procedure was successful, the error is classified as a temporary error in the record and that information is recorded in the statistical error record as indicated in block 74. In the event the error recovery procedure is not successful, the microprocessor invokes a loop write to read operation as indicated in block 76. A loop write to read operation is a conventional wrapped condition diagnostic routine which can be used to verify correct operation of the channel electronics.

Following the loop write to read operation, a determination is made as indicated in block 77 whether it was successful or failed. If the loop write to read fails, then the error can be determined to be of a hardware failure nature and an indication is provided via block 78 on display 55, whereby a customer engineer can be called.

If the loop write to read operation is successful, then the error is due to a defect in the media. In that event, the defective media location is available so that the area is not written or utilized again in recording operations involving that reel of tape. In the event a read operation was involved, then the data previously recorded at the error location is imperiled. Since the error is uncorrectable, the data cannot be recovered by the processor.

Referring to FIG. 4, a flowchart is illustrated of the operations occurring in the event of a mismatch of the count values, indicating that a single uncorrectable error was encountered in a given data block, or that two unmatched uncorrectable errors occurred. In that event an error recovery procedure is invoked as indicated in block 80. Upon completion of the error recovery procedure, a determination is made whether it was successful. If the error recovery procedure was successful, then the error is classified as a temporary error and information pertaining thereto can be recorded in the statistical error record.

In the event that the error recovery procedure was unsuccessful, then a loop write to read operation is invoked, as before. Upon completion of the loop write to read operation, a determination is made whether it was successful or failed. If the loop write to read did fail, then a hardware failure is the source of the error. In that event an indication is provided on the display whereby a customer engineer can be called. In the event the loop write to read was successful, then the error is not due to hardware failure, or media failure. Consequently, a clean drive indication is given on the display as indicated in block 88. This will allow the operator to clean the head tape interface.

The system disclosed provides a capability which was not heretofore available in magnetic storage systems whereby a media error can be classified in a positive fashion. Consequently, the invention enables attainment of a higher reliability in the end disk storage recording without the addition of significant costly hardware.

What is claimed is:

1. In a magnetic storage system including a microprocessor wherein data read/write operations are carried out by data read/write means upon magnetic storage media in data blocks, and wherein the system further includes error correction circuit means for detecting and correcting errors and identifying uncorrectable errors, counter means for monitoring error locations in a given data block as well as counts corresponding to the tape location of such errors, including uncorrectable errors, means for storing the locations and counts corresponding to occurrence of an uncorrectable error, means responsive to the error correction circuit means for retrying a read or write operation to eliminate the error, and means for comparing the recorded error counts for initial and retry operations to identify when a match of count values occurs, and means for evaluating the existence of matched error conditions to isolate tape media caused errors from hardware caused errors.

2. The system of claim 1 wherein the media is magnetic tape.

3. The system of claim 2 wherein said means for monitoring includes a counter responsive to the microprocessor for counting data positions in a selected data block when an error occurs.

4. The system of claim 3 wherein said means for storing includes storage register means corresponding to initial and retry read/write operations.

5. In a magnetic storage system including a microprocessor wherein data read/write operations are carried out by data read/write means upon magnetic storage media in data blocks, and wherein the system further includes error correction circuit means for detecting and correcting errors and identifying uncorrectable errors;

microprocessor controlled counter means for monitoring error location in a given data block as well as the counts corresponding to the tape location of such errors, including uncorrectable errors;

storage means for storing a location and counts corresponding to occurrence of an uncorrectable error;

read/write control means responsive to the error correction circuit means for retrying a read or write operation to eliminate the error;

other storage means responsive to said microprocessor for storing the location and counts corresponding to occurrence of an uncorrectable error on the retry operation;

comparator means responsive to said microprocessor for comparing the recorded error counts for the initial and the retry operations, to identify when a match of count values occurs, and error evaluation means for evaluating the existence of match error conditions to isolate tape media caused errors from hardware caused errors.

6. The system of claim 5 further including evaluation means for evaluating the existence of mismatched error conditions to isolate hardware caused errors from errors resulting from a dirty head tape interface.

* * * * *